US006747536B1

(12) United States Patent
Miller, Jr.

(10) Patent No.: US 6,747,536 B1
(45) Date of Patent: Jun. 8, 2004

(54) MAGNETIC WALL STUD LOCATOR

(76) Inventor: George Miller, Jr., 10810 N. Fleet Dr., Anchorage, AK (US) 99515

( * ) Notice: Subject to any disclaimer, the term of this patent is extended or adjusted under 35 U.S.C. 154(b) by 0 days.

(21) Appl. No.: 10/277,385

(22) Filed: Oct. 21, 2002

(51) Int. Cl.[7] .................................................. H01F 7/20
(52) U.S. Cl. ........................... 335/285; 335/302; 324/67
(58) Field of Search .................... 335/285, 302–306; 294/65.5; 324/67

(56) References Cited

U.S. PATENT DOCUMENTS

| D374,595 S | * | 10/1996 | Welder | ........................... D8/14 |
| 6,229,294 B1 | * | 5/2001 | Wun | ............................. 324/67 |
| 6,456,053 B1 | * | 9/2002 | Rowley | ........................ 324/67 |

* cited by examiner

Primary Examiner—Ramon M. Barrera
(74) Attorney, Agent, or Firm—Michael J. Tavella

(57) ABSTRACT

A device for finding studs in a wall that uses a strong magnet mounted in a pen-like holder. The device is slid along a wall until a fastener is detected. The magnet is strong enough to provide firm pull on the fastener providing a sure response to the stud. The magnet is also strong enough to hold the device securely to the wall so that it projects out orthogonally from the wall surface. The device can then be left in place, with no need to mark the location of the stud on the wall. Moreover, the device can be left in place while additional studs are located using the device as a reference and a tape measure to measure standard stud spacing in the wall. In this way, one or more studs may be quickly and surely located.

8 Claims, 3 Drawing Sheets

MAGNETIC WALL STUD LOCATOR

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to wall stud locator tools and particularly to magnetic wall stud locator tools.

2. Description of the Prior Art

Wall stud locator tools, often called "stud finders" have been developed over the years to assist in locating wall studs behind drywall r plaster walls. Once the walls have been finished, the location of the wall studs is not readily apparent. Two basic types of stud finders have been developed. One type uses the difference in density between the open stud cavity and the stud itself. This type is expensive. The second type is the magnetic stud finder. Because wall board or plaster lath is secured to the studs using metal fasteners, a magnet can be used to locate the stud by seeing differences in an alignment of a magnet as it passes over a wall. Once such device uses a flat housing and a magnet that sits vertically on a hinge pin. In the absence of metal, the magnet sits to one side of vertical, in the presence of metal, it stands straight. The problem with the device is that the magnet is weak. Also, the hinge pin construction causes the magnet to flop around as it is moved across the wall. This movement is exacerbated by a textured wall because every irregular surface causes the magnet to move. Because the magnet is weak, moving the magnet too fast may give false readings. It takes a while to find a stud using this device because one might have to pass over the fastener a few times before it is certain that the magnet is properly indicating a stud. Once found, the stud must be marked immediately as the device does not stick to the wall. Obviously, if the device is removed to obtain a marker, it may take additional time to relocate the stud with certainty. Similarly, other stud finders cannot be left in place once the stud is located.

BRIEF DESCRIPTION OF THE INVENTION

The instant invention overcomes these problems. It uses a strong magnet mounted in a pen-like holder. The device is slid along a wall until a fastener is detected. The magnet is strong enough to provide firm pull on the fastener providing a sure response to the stud. The magnet is strong enough to hold the device securely to the wall so that it projects out orthogonally from the wall surface. The device can then be left in place, with no need to mark the location of the stud on the wall. Moreover, the device can be left in place while additional studs are located using the device as a reference and a tape measure to measure standard stud spacing in the wall. In this way, one or more studs may be quickly and surely located.

DETAILED DESCRIPTION OF THE INVENTION

Figure 1:
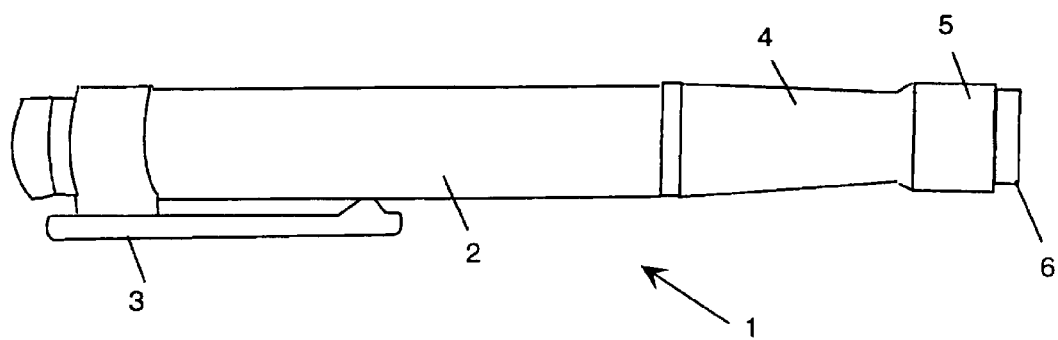
FIG. 1 is a side view of the invention.

Referring now to FIG. 1, a side view of the invention 1 is shown. The invention 1 has a pen-like body 2 that has a clip 3 attached to the top of the body 2 as shown, so that the device can be carried in a pocket. A grip portion 4 is provided near the base to assist in holding the device. The end of the tool has a cylinder 5, attached to the grip end of the tool, and a magnet 6 installed in the cylinder 5.

Figure 2:
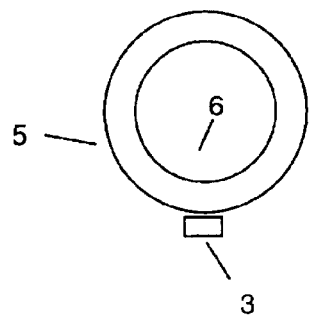
FIG. 2 is an enlarged bottom view of the invention.

FIG. 2 is an enlarged view of the invention, which shows the magnet 6 in place in the cylinder 5. In the preferred embodiment, the magnet 6 is ½-inch (12 mm) in diameter The use of a pen-like body is preferred because it forms a convenient form to carry, store and hole the tool. Of course, the body 2 can be modified. For example, it can be triangular or square. However, it is important that the body 2 be light and long so that when the magnet is held to a fastener, the tool extends out from the wall surface at a right angle. This makes location and marking of the studs much easier and less prone to error.

Figure 3:
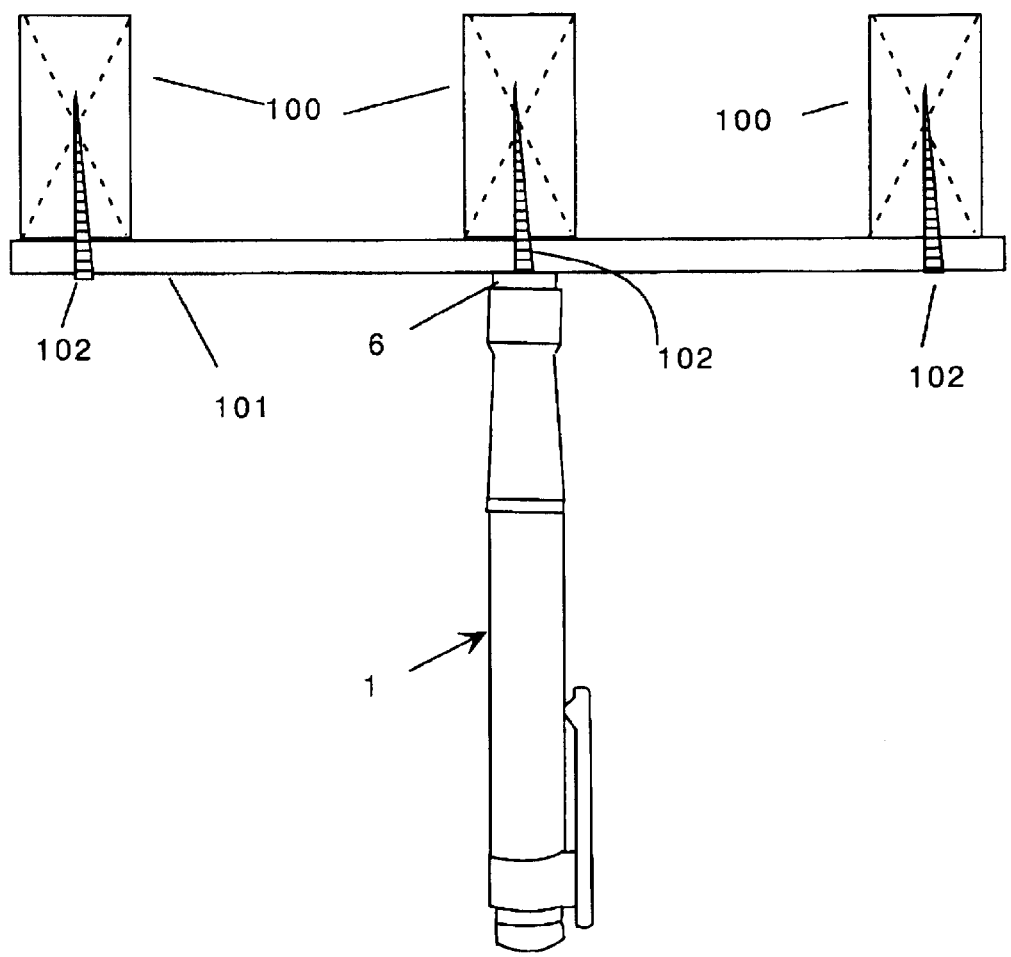
FIG. 3 is a diagrammatic view of a typical wall section showing a top view of the tool locating a stud.

FIG. 3 is a diagrammatic view of a typical wall section showing a top view of the tool locating a stud. Here, a wall section is shown that has studs 100 and a wallboard (or similar) covering 101. The studs 100 can be either wood or metal, as is common in the art. A number of fasteners, such as drywall screws 102 are used to secure the wallboard to the stud 100. In this view, the tool 1 is being moved along the wall in the location of the arrow. The tool 1 is resting over a fastener and can be left to stand out from the wall as shown. Because of the strength of the magnet 6, it does not matter of the wall surface is smooth or textured. The magnet will not give a false reading because of a textured surface.

Figure 4:
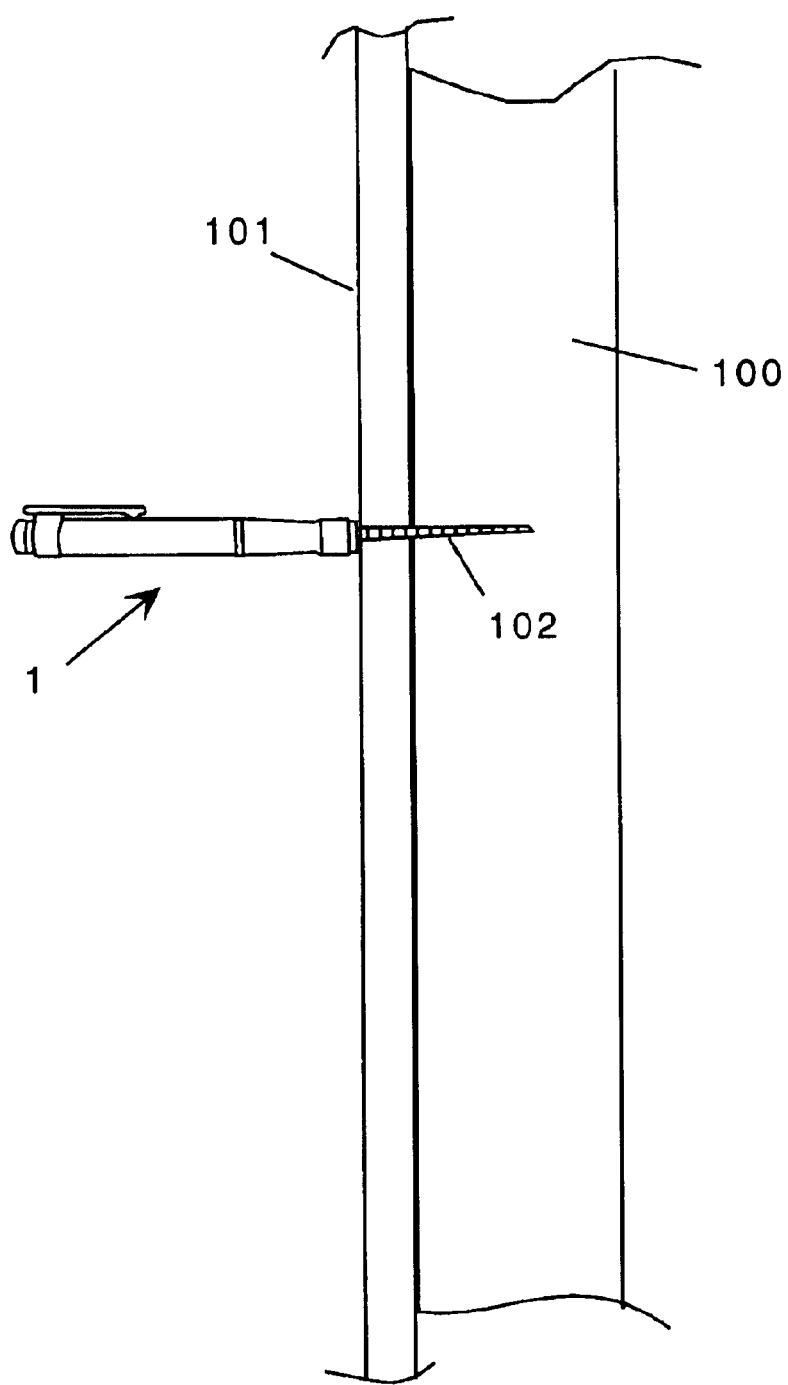
FIG. 4 is a diagrammatic view of a typical wall section showing a side view of the tool being held in place on a wall by the magnet.

FIG. 4 is a diagrammatic view of a typical wall section showing a side view of the tool 1 being held in place on a wall by the magnet 6. In this view, a side view of the tool is shown showing it held by the fastener 102 as it extends out of the wall.

In the preferred embodiment, the magnet has a holding strength of at least 6 pounds (2.7 kg). This ensures that the device is able to stand out from the wall and remain in place.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for finding studs in a wall comprising:
   a) a housing having a length, and a width, wherein the width is smaller than the length, forming an elongated barrel having a first end and a second end; and
   b) a magnet, secured to the first end of the elongated barrel;
   c) and further wherein when the magnet engages a metal fixture within a wall, the length of elongated barrel extends outward perpendicularly from said wall and remains temporarily fixed in that position.

2. The device of claim 1 wherein said housing is a cylinder.

3. The device of claim 1 further comprising a cylindrical magnet receptacle, attached to the first end of said elongated barrel.

4. The device of claim 1 wherein said magnet has a holding strength of at least six pounds (2.7 kg).

5. A method of finding studs in a wall comprising the steps of:
   a) moving a device having an elongated barrel having a first end and a second end, with a length and a width, wherein the width is smaller than the length, and a magnet, secured to the first end of the barrel, along a wall surface;
   b) coming into the proximity of a metal fastener secured in said wall;
   c) having said magnet magnetically engage said metal fastener; and
   d) having said magnet hold said device against said wall in a position such that the length of said barrel extends outward from the wall orthogonal to said wall surface, being held solely by the magnet in said first end of said elongated barrel.

6. The method of claim 5 wherein said housing is a cylinder.

7. The method of claim 5 wherein the housing further comprises a cylindrical magnet receptacle, attached to the first end of said elongated barrel.

8. The method of claim 6 wherein said magnet has a holding strength of at least six pounds (2.7 kg).

* * * * *